March 20, 1956
J. F. CLAYTON
2,739,233
PULSE FORMING CIRCUIT
Filed Oct. 16, 1950
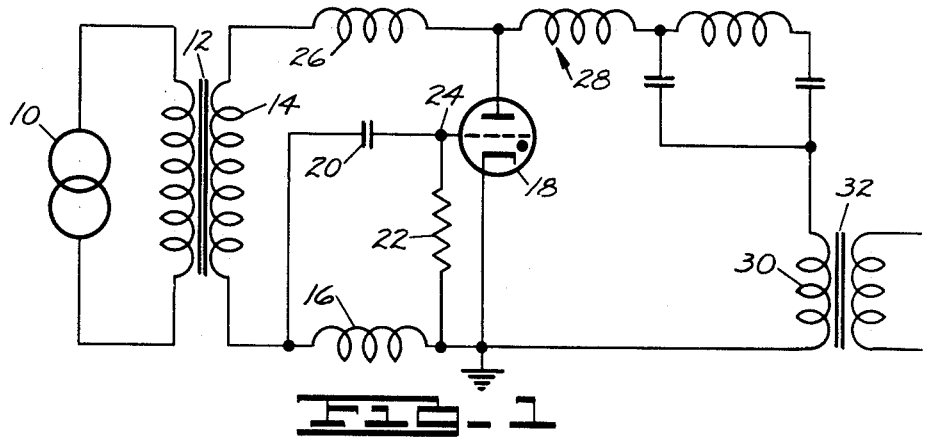
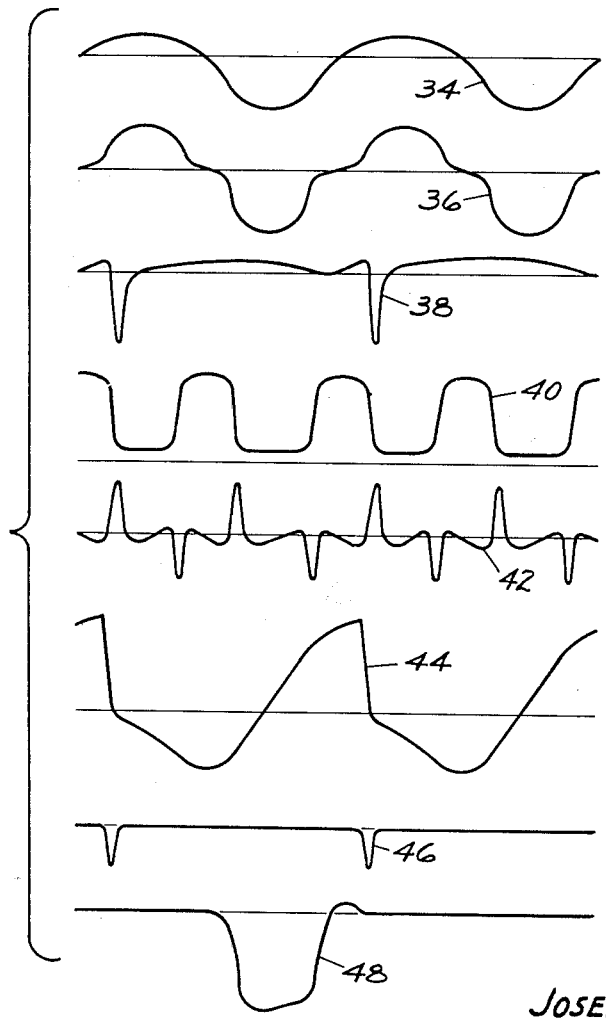
INVENTOR.
JOSEPH F. CLAYTON
BY
Ellsworth R. Roston
ATTORNEY

United States Patent Office 2,739,233
Patented Mar. 20, 1956

2,739,233

PULSE FORMING CIRCUIT

Joseph F. Clayton, Detroit, Mich., assignor to Bendix Aviation Corporation, Detroit, Mich., a corporation of Delaware Application October 16, 1950, Serial No. 190,398

2 Claims. (Cl. 250—27)

This invention relates to pulse forming circuits and more particularly to circuits operative on alternating voltage to provide a pulse at a predetermined instant in each voltage cycle.

In pulse-forming circuits employing a network charged from a source of alternating voltage, the voltage source charges the network for a predetermined period of time. The network is part of a series resonant circuit, so that it is charged to a relatively high voltage during the charging period, which may comprise one or more cycles. At the end of each charging period, a switch is closed to provide a path of relatively low impedance for the network discharge. The pulses which are produced are employed in radar and other applications to obtain such information as the direction and range of a distant object.

Until recently, the switch was not synchronized with the voltage source to close at a predetermined time in each cycle of alternating voltage, especially when the frequency of the alternating voltage varied. However, in co-pending applications No. 135,952 filed December 30, 1949, Patent No. 2,674,691 granted April 6, 1954 to Stanley J. Krulikoski, Jr., et al. and No. 143,140 filed February 8, 1950, Patent No. 2,625,652 granted January 13, 1953 to Stanley J. Krulikoski, Jr., et al., circuits have been disclosed for forming output pulses, independently of any variation in frequency of the applied voltage, at substantially the instant in which the network has been charged to a maximum value.

This invention also provides a circuit for forming a pulse at a predetermined instant in each voltage cycle, regardless of the frequency of the applied voltage. The circuit has the further advantage of requiring a minimum number of parts, none of them vacuum tubes. Thus, in addition to drawing a minimum amount of power, the circuit forms pulses which are stable and substantially independent of variations in vacuum tube circuit parameters.

An object of this invention is to provide a circuit for forming a pulse at a predetermined instant in each cycle of alternating voltage.

Another object is to provide a circuit of the above character for generating pulses of maximum amplitude by discharging a network at each instant that the network has been charged to an optimum voltage.

A further object is to provide a circuit of the above character for forming pulses of maximum amplitude and stability regardless of any variations in frequency of the applied voltage.

Still another object is to provide a circuit of the above character which employs a minimum number of parts, occupies a minimum amount of space, and draws a minimum amount of power.

A still further object is to provide a circuit of the above character which is independent of variations in vacuum tubes.

Other objects and advantages will be apparent from a detailed description of the invention and from the appended drawings and claims.

In the drawings:

Figure 1 is a circuit diagram of one embodiment of the invention; and

Figure 2 shows the wave forms and phase relationships of different voltages, currents and impedances in the circuit shown in Figure 1.

In the embodiment of the invention shown in Figure 1, alternating voltage is supplied by a generator 10 to a transformer 12 having a secondary winding 14. A saturable inductor 16 is connected at one end to the secondary winding 14 and at the other end to the grounded cathode of a gas-filled tube, such as a hydrogen thyratron tube 18. A capacitance 20 and a relatively low resistance 22 are provided in series across the inductor 16 and are connected at their common terminal 24 to the grid of the tube 18.

The plate of the tube 18 is connected to the secondary winding 14 of the transformer 12. An inductor 26 may be provided between the secondary winding 14 and the tube 18 in case the internal inductance of the generator 10 and the leakage inductance of the transformer 12 are not sufficient to make a network, generally indicated at 28, resonant at the frequency of the applied voltage. The network 28 has a plurality of sections of inductances and capacitances, with the capacitance of each section having a value of C. With $n$ sections, the network has a capacitance reactance of approximately $$\frac{-j}{2\pi f n C}$$

at the frequency of the applied voltage, where $f$ is the frequency of the applied voltage. The network 28 is connected to the primary winding 30 of a pulse transformer 32.

In operation, the voltage induced in the secondary winding 14 causes current to flow through a circuit which includes the winding 14, the inductor 26, the network 28, the primary winding 30 of the transformer 32 and the parallel branches formed by the inductance 16 and by the resistance 22 and capacitance 20. This current, designated as $i_n$, charges the capacitances in the network 28.

The current $i_n$ is the vectorial sum of the currents $i_x$ and $i_y$ flowing through the inductor 16 and capacitance 20, respectively. When the current $i_n$ is relatively low, the inductor 16 has a relatively high reactance, which prevents a large current from flowing through the inductor. As a result, most of the current $i_n$ flows through the capacitance 20 and charges the capacitance.

As the current $i_n$ increases, the inductor 16 suddenly becomes saturated and its reactance decreases very rapidly to a relatively low value. Since the inductor now provides a low impedance across the capacitance 20, the capacitance discharges in a very sharp pulse through the resistance 22 and the inductor. This discharge is in a direction to drive the grid of the thyratron tube 18 positive and causes the tube 18 to conduct. The conduction of the tube 18 provides a discharge path for the network 28, which discharges in a pulse of short duration and large amplitude through a circuit including the network 28, the tube 18 and the primary winding 30 of the pulse transformer 32.

The phase relationships of the current $i_n$ through the charging network 28, the current $i_x$ through the inductor 16 and the current $i_y$ through the capacitance 20 are illustrated by the curves 34, 36 and 38 in Figure 2. Curve 40 shows how the reactance of the inductor 16 varies with changes in the current $i_x$, and curve 42 illustrates how the voltage on the grid of the tube 18 depends upon the value of the inductor 16. The voltage on the network 28 is shown in curve 44 and the voltage pulses produced in the transformer 32 by the discharge of the network 28 are shown in curve 46. An enlarged view of one of the pulses in the transformer 32 is shown in curve 48.

As may be seen in curve 40, the inductor 16 becomes saturated at a relatively low value of current, such that the current may be considered as approximating zero. At zero current, the network 28 is charged to a maximum value, as illustrated in curve 44, since the capacitive reactance of the network at the charging frequency causes the voltage on the network to lead the current by approximately 90°. Thus, the network discharges when it has reached a maximum value and produces a pulse of optimum amplitude in the pulse transformer 32. Since the drop in the reactance of the inductance 16 occurs at substantially zero current regardless of frequency variations in the applied voltage, the network 28 always discharges when it has reached a maximum voltage. Thus, the formation of voltage pulses in the transformer 32 is independent of the frequency of the applied voltage.

In addition to the advantages discussed above, the circuit shown in Figure 1 has several other advantages. The circuit employs no tubes other than the hydrogen thyratron tube 18 and thus is not subject to variations in performance resulting from differences in tube characteristics. Since the circuit requires a minimum number of parts, it occupies a minimum amount of space and draws a minimum amount of power. These features are especially important in military applications where weight, space and power requirements are important factors.

There is thus provided a circuit for producing pulses of optimum stability and amplitude. The operation of the circuit is independent of changes in such circuit parameters as vacuum tube characteristics and the frequency of the applied voltage.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A pulse forming circuit, including, a source of alternating voltage, a saturable inductance having a relatively large value for low currents and a relatively low value for increased currents, a network connected in series with the voltage source and the inductance to form a resonant circuit for the charging of the network, a normally non-conductive gas-filled tube having a cathode, a grid and a plate, the network being connected between the cathode and plate of the tube for discharge through the tube upon the conductivity of the tube, and a capacitance connected across the inductance for charging during the time that the inductance has a relatively large value and for discharging through the inductance upon a decrease in the value of the inductance, the capacitance being connected to the grid of the tube to trigger the tube into conductivity upon its discharge.

2. A pulse forming circuit, including, a source of alternating voltage, a saturable inductance having a relatively large value for low currents and a relatively low value for increased currents, an output load, a network connected in series with the voltage source, the inductance and the output load, a normally non-conductive gas-filled tube having a cathode, a grid and a plate, the network and the load being connected to the cathode and plate of the tube for discharge of the network through the tube and the load upon the conductivity of the tube, a resistance, and a capacitance connected in series with the resistance across the inductance for charging during the time that the inductance has a relatively large value and for discharging through the inductance upon a decrease in the value of the inductance, the common terminal between the capacitance and the resistance being connected to the grid of the tube to provide a triggering pulse for the tube upon the discharge of the capacitance.

References Cited in the file of this patent

UNITED STATES PATENTS

| | | |
|---|---|---|
| 2,011,381 | Suits | Aug. 13, 1935 |
| 2,082,123 | Samuel | June 1, 1937 |
| 2,462,872 | Klemperer | Mar. 1, 1949 |
| 2,462,885 | Moore | Mar. 1, 1949 |
| 2,469,977 | Morrison | May 10, 1949 |
| 2,577,512 | Cooper | Dec. 4, 1951 |
| 2,625,652 | Kurlikoski, Jr. | Jan. 13, 1953 |